US008527450B2

(12) United States Patent
Jain et al.

(10) Patent No.: US 8,527,450 B2
(45) Date of Patent: Sep. 3, 2013

(54) APPARATUS AND METHODS FOR ANALYZING AND USING SHORT MESSAGES FROM COMMERCIAL ACCOUNTS

(75) Inventors: Alpa Jain, San Jose, CA (US); Ana-Maria Popescu, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 396 days.

(21) Appl. No.: 13/071,214

(22) Filed: Mar. 24, 2011

(65) Prior Publication Data
US 2012/0246097 A1    Sep. 27, 2012

(51) Int. Cl.
G06F 15/18    (2006.01)
G06N 5/02    (2006.01)
(52) U.S. Cl.
CPC ..................... *G06N 5/025* (2013.01)
USPC .............................. 706/54; 706/12
(58) Field of Classification Search
None
See application file for complete search history.

(56) References Cited

U.S. PATENT DOCUMENTS
6,233,575 B1 *   5/2001   Agrawal et al. ........................ 1/1
2010/0161527 A1 *   6/2010   Sellamanickam et al. ...... 706/12

OTHER PUBLICATIONS

Phan, Xuan-Hieu et al.; "Learning to Classify Short and Sparse Text & Web with Hidden Topics from Large-Scale Data Collections"; 2008; ACM; WWW 2008; pp. 91-100.*
Ramage, Daniel et al.; "Characterizing Microblogs with Topic Models"; 2010; Association for the Advancement of Artificial Intelligence; Proceedings of the Fourth International AAAI Conference on Weblogs and Social Media; pp. 130-137.*
Sriram, Bharath et al.; "Short Text Classification in Twitter to Improve Information Filtering"; 2010; ACM; SIGIR '10; pp. 841-842.*
Friedman, J.H. Greedy Function Approximation: A Gradient Boosting Machine, *The Annals of Statistics*, 29:5 (2001), 1189-1232 (45 Pages).
Smola, A., et al. "An Architecture for Parallel Topic Models," *Proceedings of VLDB*, 2010 (8 Pages).

* cited by examiner

*Primary Examiner* — Jeffrey A Gaffin
*Assistant Examiner* — Stanley K Hill
(74) *Attorney, Agent, or Firm* — Weaver Austin Villeneuve & Sampson LLP

(57) ABSTRACT

Disclosed are methods and apparatus for analyzing and using online short messages from promoting entity accounts (e.g., business or non-profit accounts). In one embodiment, a method of analyzing and using messages sent for a plurality of promoting entity accounts is disclosed. A plurality of models for classifying a plurality of messages based on a plurality of message features are obtained for each message. Each message is sent via a computer network between a selected one of the promoting entity accounts and one or more subscribing users that subscribe to receive messages from such selected promoting entity account, and each model is trained to identify whether a message belongs to a particular class based on a lexicon that was generated for such particular class and a training set of messages that belong to the particular class and message that do not belong to the particular class. A new message is classified based on the models and retaining classification information regarding the new message in a database that is accessible by a user so as to review the classification information on a computer display.

20 Claims, 5 Drawing Sheets

| Engagement: all (0.04) | Examples |
|---|---|
| survey/poll (0.02) | Is an Alicia Keys written song good enough? decide: http://ow.ly/jouC"" |
| contest (0.01) | follow @miladyteam to win an ipod touch! |
| other (0.01) | Have a great 2010 ! |
| Announcements (0.13) | Examples |
| events (0.07) | November 21st enjoy a Gingerbread House Workshop in Shakopee MN |
| deal/coupon/sale (0.03) | Deal of the Day: HP Photosmart C6180 All-in-One Printer / Scanner / Copier 199.99 |
| product release (0.001) | New doubleTwist Windows release is out!.. |
| schedule (0.001) | Closed Monday |
| other (0.088) | One for charities: payment schedule over Christmas |
| job openings (0.01) | diesel mechanic (New Brunswick) |
| Brand awareness (0.167) | Best solutions for your scrapbooking needs! |
| Engagement: specific (0.22) | Examples |
| customer service (0.192) | @bhkahului Do you still have concerns ? |
| general discussion (0.02) | @wslkyBarKol I'm a Pet Shop Boys fan |
| showcase/retweet (0.01) | RT @ralphryan: Personal responsibility Don't blame someone else (...) |
| other (0.01) | @popjustice what |
| Content + links (0.43) | Examples |
| news updates (0.37) | Commercial Vehicle Group Reports Second Quarter 2009 Results http://bit.ly/1tLydr |
| opinions/advice (0.006) | what an incredible goal for team USA woot |
| other 0.06 | what is this |

Figure 3

| Month | Topic | Example terms |
|---|---|---|
| 01-2010 | Haiti Earthquake | haiti, relief, donate, cross, red, eforts, text |
| 01-2010 | New Year's | year, resolution, healthy, calories |
| 01-2010 | Politics | obama, state, president, union, politics |
| 02-2010 | Valentine Day | day, valentine's, romantic, dinner, reservations |
| 02-2010 | Sweets | chocolate, vanilla, raspberry, banana, carrot, chip |
| 02-2010 | Superbowl | super, bowl, sunday, saints, colts, party |
| 03-2010 | Spring training | spring, training, qualify, younger, break |
| 03-2010 | Saint Patrick's Day | day, st, patrick's, patricks, irish, paddy's, parade |
| 03-2010 | Drink specials | happy, hour, half, earth, drinks |

Figure 6

APPARATUS AND METHODS FOR ANALYZING AND USING SHORT MESSAGES FROM COMMERCIAL ACCOUNTS

BACKGROUND OF THE INVENTION

The present invention is related to techniques and mechanisms for managing short messages, such as tweets that are restricted to 140 characters or less, sent between one entity and one or more users over a computer network.

Business or other promoting types of users of the Internet have access to a wide variety of applications that allow them to communicate with selected audiences, such as subscribing customers, regarding topics of interests. One specific example of an online messaging service that can be-used by a business entity is Twitter (a web service that is available at www.twitter.com) that allows a business entity to communicate with one or more subscribing customers about a specific topic, such as a troubleshooting process, using short messages known as "tweets." In another Twitter example, a commercial user can inform about sales events and advertise specific products or services to subscribing users.

Although short messages or tweets can be used to provide information to subscribing users and limited interactions, there continues to be a need for improved mechanisms for facilitating more effective uses of short messages to inform or help users.

SUMMARY OF THE INVENTION

In certain embodiments, apparatus and methods for analyzing and using online short messages from promoting entity accounts (e.g., business or non-profit accounts) are disclosed. In one embodiment, a method of analyzing and using messages sent for a plurality of promoting entity accounts is disclosed. A plurality of models for classifying a plurality of messages based on a plurality of message features are obtained for each message. Each message is sent via a computer network between a selected one of the promoting entity accounts and one or more subscribing users that subscribe to receive messages from such selected promoting entity account, and each model is trained to identify whether a message belongs to a particular class based on a lexicon that was generated for such particular class and a training set of messages that belong to the particular class and message that do not belong to the particular class. A new message is classified based on the models and retaining classification information regarding the new message in a database that is accessible by a user so as to review the classification information on a computer display.

In a specific application, obtaining the models and classification are provided by a Gradient Boosted Decision Trees algorithm, and content from the new message is provided to other users who are not subscribers to the new message's corresponding promoting entity account based on the classification of such new message. In another aspect, a particular lexicon for a particular class is generated by (i) manually classifying a sample of messages as belonging to the particular class, (ii) forming the particular lexicon from a top percentage of most frequently used tokens from the sample of messages, (iii) automatically clustering a larger sample of messages into a plurality of topics, and (iv) to the particular lexicon, adding tokens from one or more topics that also include one or more tokens form the particular lexicon. In a further aspect, the clustering is performed by a Latent Dirichlet Allocation algorithm. In a specific further implementation, the messages from the larger sample are ranked based on the messages that are most likely to belong to the particular class and only a percentage of the highest ranked messages are clustered for the particular class.

In another embodiment, a particular model for the particular class is trained by (i) providing a training set of messages that belong to the particular class and messages that do not belong to the particular class, (ii) determining a plurality of feature values for each message in the training set, and (iii) continuing to adjust the particular model as a function of the features values of each message in the training set and the particular lexicon until the particular model classifies the training set with a predetermined level of accuracy. In a further aspect, the feature values correspond to the percentage of message tokens that are in the particular lexicon and one or more of the following: percentage of numeric message tokens, percentage of message tokens from a junk lexicon, percentage of message tokens that are URL's (universal resource locators), message length, and percentage of message tokens that are pronouns.

In another embodiment, the invention pertains to an apparatus having at least a processor and a memory. The processor and/or memory are configured to perform one or more of the above described operations. In another embodiment, the invention pertains to at least one computer readable storage medium having computer program instructions stored thereon that are arranged to perform one or more of the above described operations.

These and other features of the present invention will be presented in more detail in the following specification of certain embodiments of the invention and the accompanying figures which illustrate by way of example the principles of the invention.

BRIEF DESCRIPTION OF THE DRAWINGS

FIG. 3 shows a table of example classes and subclasses into which a sample of business tweets are divided using one example taxonomy derived manually.

FIG. 6 contains a table of examples of classes of topics obtained from a plurality of message tweets.

DETAILED DESCRIPTION OF THE SPECIFIC EMBODIMENTS

Figure 1:
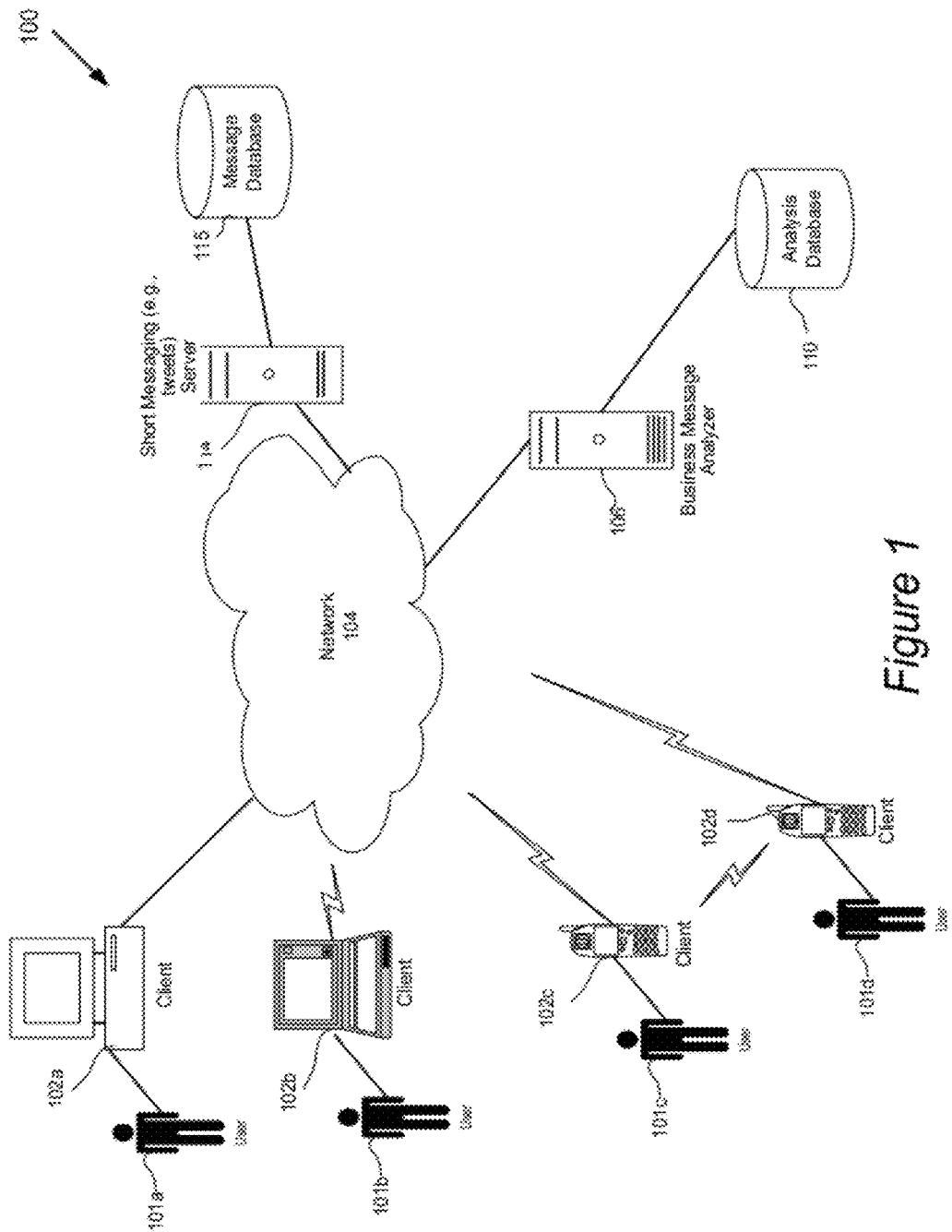
FIG. 1 illustrates an example network segment in which the present invention may be implemented in accordance with one embodiment of the present invention.

Reference will now be made in detail to specific embodiments of the invention. Examples of these embodiments are illustrated in the accompanying drawings. While the invention will be described in conjunction with these specific embodiments, it will be understood that they are not intended to limit the invention to one embodiment. On the contrary, they are intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Businesses are increasingly viewing social media and microblogging services as a platform for reaching out to their customers, helping them or listening to their feedback. Additionally, social media offers an opportunity to seek out and add new customers. Certain embodiments of the present invention provide an initial exploration of business Twitter accounts in order to start understanding how businesses interact with users and vice versa. The results of the exploration can be used for a number of purposes, such as to help differentiate successful business-related tweets from unsuccessful ones, offer effective customer interfacing strategies to businesses, or recommend business-related content to Twitter users.

In another application, certain tweet content may be promoted in other types of venues in which the message content may be useful to other users, rather than having the tweets promoted only to Twitter subscribers. For instance, user on-line activity and user profile information may be matched to specific types of message content. In a specific example, users who visit automobile related web sites or have an interest in automobiles (e.g., as listed in their profile or inferred through past user activity) may be deemed to likely be interested in promotional or announcement tweets from automobile businesses. In another example, users of Yahoo! Local may be presented with particular promotional or announcement tweet content based on their on-line activity, even if such users are not following the message feed (e.g., are not Twitter subscribers) for the particular business. For instance, if a user is searching for a particular type of business (e.g., landscaping), deals from businesses of the searched type (e.g., landscaping business) may be promoted to such users while they are searching. In one implementation, a banner ad or promotion from the particular business may be displayed to the user who is searching for the same type of business on a local search site, such as Yahoo! Local or Yelp. Thus, users of particular online venues may receive promotional or announcement message/tweet content even if they are not subscribers to the particular content.

Although embodiments of the present invention are described herein with respect to Twitter accounts and tweet type messages, embodiments may be applied to other types of messaging services and short messages. Additionally, although certain embodiments are described herein with respect to analyzing messages for business accounts for business type entities, any suitable promoting entity that uses a short messaging/Twitter account to promote, e.g., an idea, agenda, debate, etc., could utilize the analysis techniques described herein. For example, non-profit organizations may utilize any of the described techniques for analyzing Tweets sent to their clients or benefactors. Other types of organizations may include political organizations or candidates, public organizations or people in various entertainment fields, news organizations, financial or media organizations, industry experts etc.

Prior to describing one detailed embodiment for analyzing and using short messages in a commercial or service setting, a computer network architecture will first be briefly described to provide an example context for practicing techniques of the present invention. FIG. 1 illustrates an example network segment 100 in which the present invention may be implemented in accordance with one embodiment of the present invention. As shown, a plurality of clients 102a~d may receive and send short messages, such as Tweets, using various short messaging servers, e.g., short messaging server 114 for tweets, via network 104. Messaging applications may be implemented on any number of servers although only one message server 114 is illustrated for clarity and simplification of the description. Each server (e.g., 114) may have access to one or more database(s) (e.g., 115) into which message and subscriber information is retained.

In general, some users may subscribe through the messaging server 114 to a particular messaging account that is managed by another user, such as a business entity. The subscribing users then receive short messages from the business entity and participate in short messaging sessions with such business entity. For instance, as detailed below the business entity can send tweets regarding business announcements, events, promotional sales, etc.

The network may take any suitable form, such as a wide area network or Internet and/or one or more local area networks (LAN's). The network 104 may include any suitable number and type of devices, e.g., routers and switches, for forwarding requests from each client to a particular server application, forwarding application results back to the requesting clients, or forwarding data between various servers.

Embodiments of the present invention may also be practiced in a wide variety of network environments (represented by network 104) including, for example, TCP/IP-based networks (e.g., Rate Control Protocol or RCP, Transport Control Protocol or TCP, Fast TCP, Stream-based TCP/IP or STCP, eXplicit Control Protocol or XCP, etc.), telecommunications networks, wireless networks, mobile networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be affected or employed at different locations.

A messaging server may take any suitable form for providing short messaging services. In one implementation, a messaging server implements a communication application, such as Twitter, instant messaging, social networking, blogging, etc. A communication application generally allows a user (human or automated entity) to communicate with one or more other users via a communication device (e.g., telephones, persona digital assistants or PDA's, computers, etc.) via one or more networks (e.g., 104) and retain user message information, for example, in database 115. Embodiments of the present invention may be employed with respect to message data obtained from messaging server applications or generated from any messaging application, such as general communications applications that include Yahoo! Email, Yahoo! IM, Facebook, etc.

In another example implementation, a messaging server may implement a mechanism for retaining message information, e.g., in database 115, and/or streaming such message information (e.g., in a Twitter firehose) to various application users for implementing the message/tweet analysis and use techniques described herein.

Embodiments of the present invention may include business message analyzer 106 for analyzing and identifying business messages, such as tweets. The business message analyzer may be implemented within another application server, such as a message server 114 or on one or more separate servers, such as the illustrated business message analyzer system 106. In general, a business message analyzer can be configured to analyze various messages for a particular business (or other type of promoting entity) and automatically classify such messages. The business message analyzer system 106 may access one or more analysis databases, e.g., database 110, for storing representational information regarding messages, message semantic features, classification information, feature vectors, class lexicons, topic models, statistics regarding messages and classification, etc.

Mechanisms for analyzing business messages/tweets can be implemented in any suitable manner. In, one implementation, a supervised machine learning approach may be utilized to automatically classify business messages. In this example, the identification of tweets from a given class is generally treated as a supervised classification problem and a Gradient Boosted Decision Tree (GBDT) machine learning framework may be used to solve it so as to derive/learn a lexicon for each class of messages/tweets. One GBDT framework is described by Friedman, J. H. Greedy Function Approximation: A Gradient Boosting Machine, The Annals of Statistics 29, 5 (2001), 1189-1232, which document is incorporated herein by reference in its entirety. However, any other machine learning framework can be used, such as Support Vector Machines (http://www.csie.ntu.edu.tw/~cjlin/libsvm/).

Figure 2:
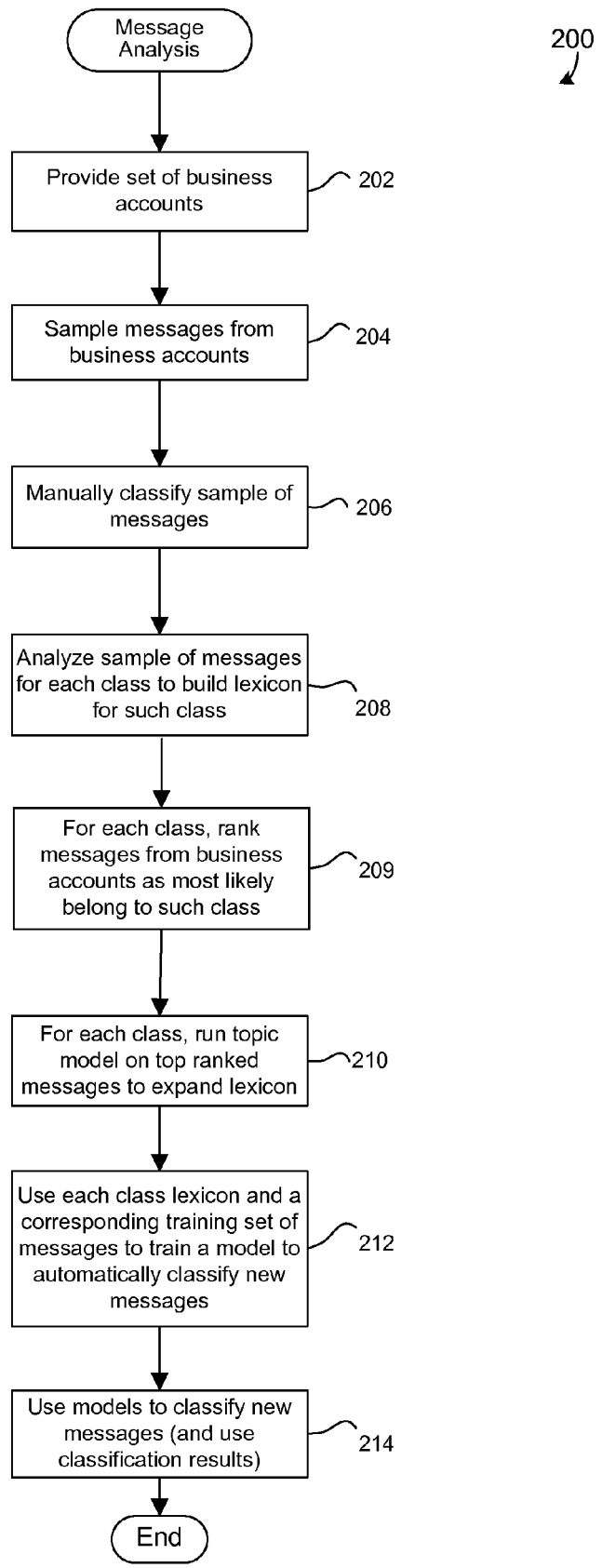
FIG. 2 is a flow chart illustrating a procedure for analyzing and classifying business messages in accordance with one embodiment of the present invention.

FIG. 2 is a flow chart illustrating a procedure 200 for analyzing and classifying business messages in accordance with one embodiment of the present invention. Initially, a set of business accounts may be provided in operation 202. For example, particular twitter accounts may be manually defined by users or automatically defined as businesses. In the later example, a dictionary of business names may be provided or extracted from Wikipedia or Yahoo! Local and this business dictionary may then be used to identify business accounts in the Twitter firehose (all tweets, all the time) by matching Twitter account names or URL's (Universal Resource Locator) with names in the provided business dictionary. Any other suitable techniques may be used to identify business message/Twitter accounts.

A small sample of messages from such business accounts is then provided in operation 204. The small sample may then be manually classified in operation 206. For example, 50 messages may be manually classified as belonging to a "deals" class, while other messages are classified as other types of classes.

FIG. 3 includes a table of example classes and subclasses into which a sample of business tweets were manually divided in one example approach using one example taxonomy derived manually. It was found that a large proportion of this initial sample of messages could be defined as belonging to an "announcement" class. An announcement can generally include messages that relate to the business product or service, but can also include current events. For example, announcements may include news updates regarding the particular business. The announcement class can be further subdivided into subclasses, such as events, deals/coupon/sale, product release, schedule, job openings, or other (as illustrated in FIG. 3). These announcement messages may be exclusive to the particular subscribing users, e.g., subscribers to the business's Twitter feed, or a repetition or reformatting of other types of announcement that are made by the business using other forms of media, e.g., television, newspapers, etc.

Another type of class that was found to be prevalent in business tweets was engagement type messages, in which a business interacts with one or more customers. Engagement messages may be directed to all subscribers, such as when conducting surveys or polls or enticing participation in contests (perhaps to entice more followers). Engagement messages may also be directed towards specific customers (e.g., customer service conversations, general discussions, feedback/retweet). Subclasses may include survey/poll, contest, customer service, general discuss, retweeting of feedback, appreciation, or trouble shooting tips from customers to other customers. Other classes may include a "content or links" class and a "brand awareness" class.

Referring back to FIG. 2, the sample of messages for each class can then be analyzed to build an initial lexicon for such class in operation 208. In certain embodiments, a message/tweet can be described by a collection of lexical and semantic features, such as tokens (e.g., unigrams, bigrams), and a lexicon can correlate these features with the class of the tweet. Said in another way, a class of tweets may have particular high frequency tokens in common. In one implementation, the initial lexicon for a particular class is formed from the top percentage (e.g., top most k unigrams and bigrams from each particular class) of most frequently used tokens. That is, the phrases or tokens that are most commonly used in the sample messages for the particular class are used to form a lexicon for such class. For example, the phrase "% off" may be the most frequently used token for the sample of messages from the "deal" class. As a result of this step, each class lexicon will contain a set of most common phrases or tokens that are likely to be present in the messages for the particular class.

Although some lexicon phrases have been identified from the initial sample for each class, the set of phrases may be expanded by using a larger sample for each class. The larger sample of messages may be taken from the entire set of known business accounts, which may include 10's of thousands of tweets/messages. If the number of messages is too large to be analyzed (e.g., by a current topic model software package), the number of messages may be first reduced. In the illustrated embodiment, the messages from the entire set of known business accounts are ranked for each class as most likely to belong to the particular class in operation 209. This process can take the form of a simple, naïve ranking that seeks to find clear examples of messages in each class. The ranking derived from the final classification results can then replace and complete the initial naïve ranking. In a specific implementation, a simple Noisy-Or scoring function may be utilized:

$$1-\Pi_{i=1}^{|L|}(1-\text{score}(t_i))$$

where L is the initial lexicon; $t_i \in L$; and $\text{score}(t_i)$ is the % of tweet tokens which appear in L (although any other suitable scoring metric may be used). Based on these scores, the top m % of ranked tweets may then be retained. Any suitable value for m may be utilized, e.g., the top 30% of tweets for each class may be used.

A topic model (or any other suitable clustering algorithm) may then be utilized on the top ranked messages for each class to expand the lexicon for such class in operation 210. In one example, a topic model for the top ranked messages can be built by running a LDA (Latent Dirichlet Allocation) package. One suitable LDA package is described in the paper by A. Smola and S. Narayanamurthy, An Architecture for parallel Topic Models, *Proceedings of VLDB,* 2010, which paper is incorporated herein by reference in its entirety. One suitable LDA package is "lda: Collapsed Gibbs sampling methods for topic models", available from Jonathan Chang of Princeton University (http://cran.r-project.org/web/packages/lda/).

In general, a topic model is configured to cluster the messages into specific topics. All topics T which contain one of a few high-precision triggers for class C can then be retained and the corresponding topic terms can be added to the lexicon L. For example, messages that relate to airline deals will be in one cluster, while messages that relate to computer deals will be in another cluster. Other messages, which are not related to deals, will reside in other clusters. For each cluster, the topic model will put together a description for the topic, using the clustered message tokens. As a result, some clusters will contain tokens from the initial lexicon, while other clusters will not. For example, the topic "airline deals" may include the phrases "% off", "marked down", etc. In this example, the initial lexicon for the "deals" class may contain the phrase "% off", but not the phrase "marked down." Since the topic model is configured to generate topic descriptions that are all related to the particular topic (e.g., airline deals), the clusters that contain seed tokens from the initial lexicon of a particular class can be assumed to contain other lexicon terms that also relate to the particular class. Accordingly, non-seed tokens from a cluster that also contains seed tokens for a particular class can also be added to the initial lexicon for such class. In the later example, the phrase "marked down" can also be added to the "deals" lexicon.

A junk lexicon, which contains stop words and low-information words (e.g. "lol", "omg", etc.), can also be generated and then used to filter out particular tweet content from the classification analysis as further described below.

Figures 4, 5:
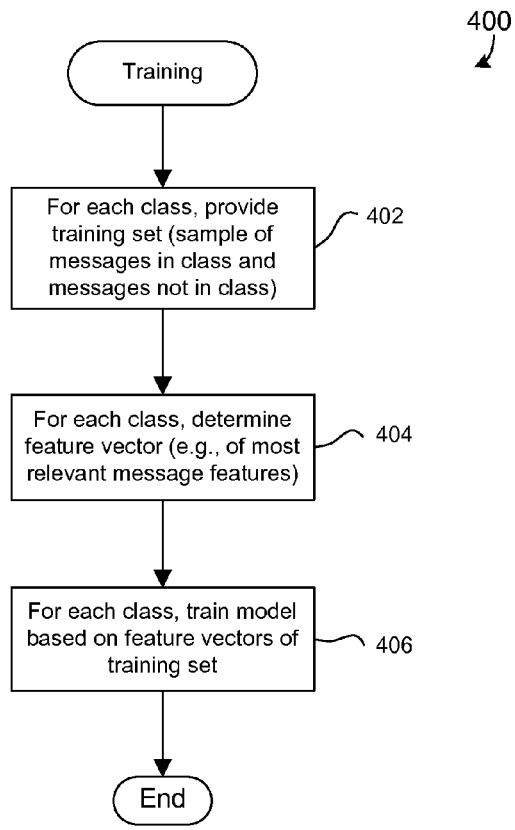
FIG. 4 is a flow chart illustrating a training process for generating a classification model in accordance with one embodiment of the present invention.
FIG. 5 is an example list of top five features for the deals and events classes in accordance with one example implementation.

Once the lexicons for each class have been expanded, each class lexicon can then be used with a training set to train a model for automatically classifying new messages in operation 212. Any suitable model generating process may be implemented. FIG. 4 is a flow chart illustrating a training process 400 for generating a classification model in accordance with one embodiment of the present invention. Although the following steps are described as being implemented with respect to each class, the entire training process would likely be implemented on one class at a time.

Initially, a training set for each class may be provided in operation 402. For a particular class, the training set would include messages belonging to the particular class and messages that do not belong to the particular class. In one example, 200 positive and 200 negative messages are used. Any suitable number of class and non-class messages may be used. In an alternative embodiment, the ratio of positive and negative messages may correspond to a manual analysis of a large set of messages. For example, if the announcement message class typically makes up 13 percent of total messages, a training set may include 130 announcement messages and 870 non-announcement messages.

A feature vector may then be determined for each class in operation 404. The feature vector may be formed from any suitable quantifiable or describable characteristics of the message. In one embodiment, a same set of features may be used for each class. In another embodiment, the particular feature vector for a particular class may be determined experimentally as the set of characteristics that are most determinative of class. That is, feature characteristics may be selected that correspond to the message being in a particular class or subclass. For example, one characteristic may be the percentage or number of class lexicon tokens that are present in the message. In another example, messages that contain pronouns have been found to correspond to particular classes, such as the events class. FIG. 5 is an example list 500 of top five features for the deals and events classes in accordance with one example implementation. Top features may include tweet/message level features, such as percentage of tweet tokens from a class lexicon, percentage of tweet tokens from the Junk lexicon, percentage of tokens which are URLs, percentage of numeric tokens, tweet length, percentage of tokens that are pronouns, etc. These examples can be generally used for deals and events classes, while other features may be utilized for other class types.

After a feature vector is determined for a particular class, a model may then be trained based on the feature vectors of the training set in operation 406. Training can involve exhaustively examining a wide range of feature weights and values and picking a set that maximizes accuracy and recall (or a combination of both called F-measure). In one example in which only accuracy is maximized, the model can be adjusted until about 75-80% accuracy is achieved.

Referring back to FIG. 2, after a class model is trained, the model can then be used to classify new messages and optionally use such classification results in operations 214. For example, new tweets may be issued by a particular business account to one or more subscribers to the business account's Twitter feed. A classification model may be used for each new message in real time or at any suitable time on a set of new messages based on any suitable criteria. By way of examples, use of a classification model may be triggered after a particular number of tweets/messages are sent with respect to a particular business account, after a predefined period in which one or more tweets have been sent, etc. In these examples, tweets may be collected and retained for each business account until after the classification process is implemented on them. After a new message is classified, the new message may be sent to other users based on the new message's class. For example, announcement or event messages may be sent to users who may be interested in the particular business.

Similar analysis techniques may be used in another application embodiment. In order to understand not just the different functions of business tweets but also their topics, the above described process may also be used to mine potential topics from business tweets/messages (examples are included in FIG. 6). The results of FIG. 6 were produced by manually analyzing the top 25 topics that were found from each month (75 topics total) and it was found that 60 topics (80%) were understandable and easy to describe. FIG. 6 contains a table 600 of examples of classes of topics obtained from a plurality of message tweets. Some topics can be seen to be related to the business domain (e.g., Food, Drink). Other general-interest topics, such as holidays and celebrations, important political or sports events, were also found. Such topics reflect the way in which businesses adapt their communication based on the broader societal preoccupations and could potentially be used for better organizing and recommending business account content.

Figure 7:
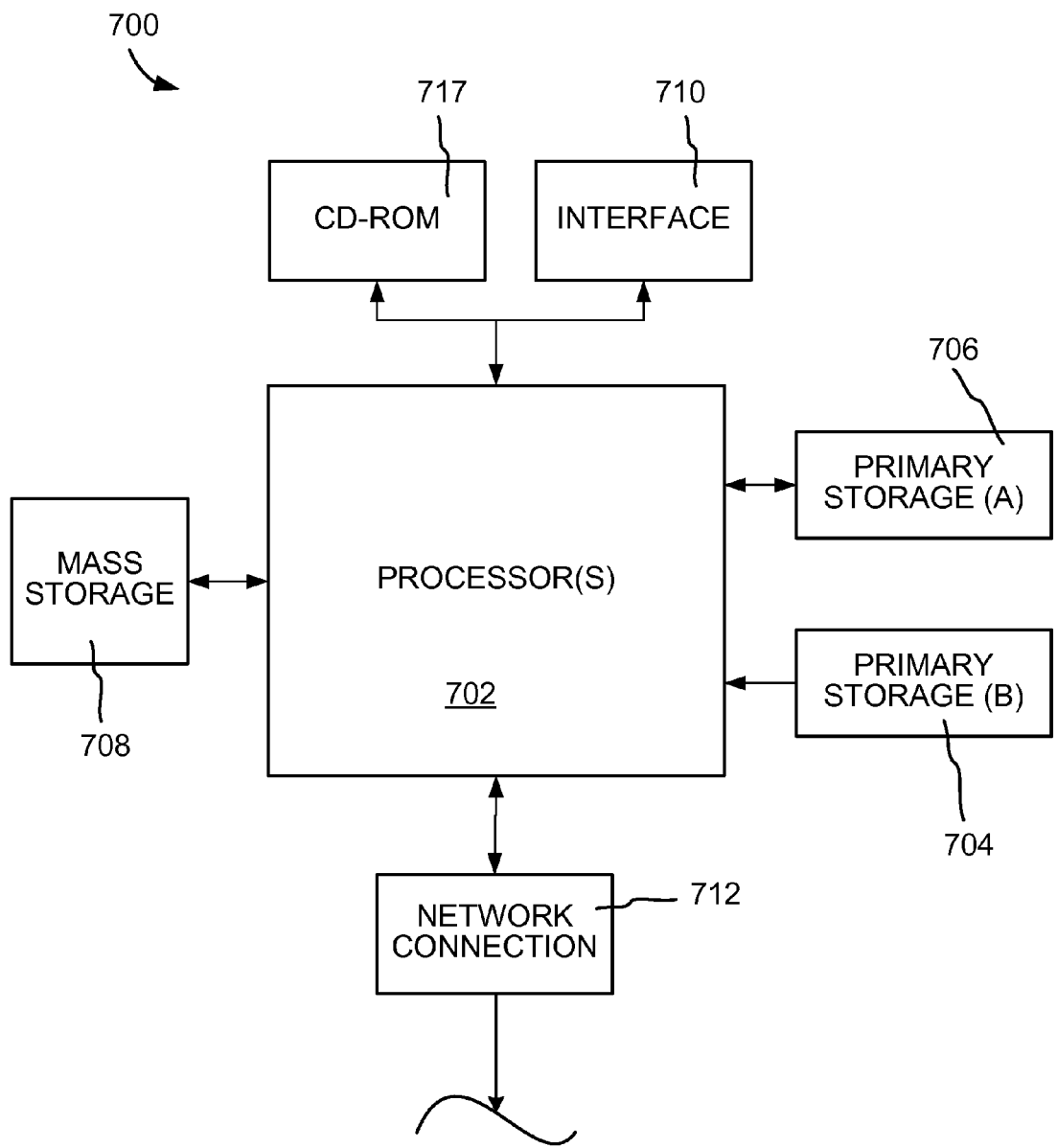
FIG. 7 illustrates an example computer system in which specific embodiments of the present invention may be implemented.

FIG. 7 illustrates a typical computer system that, when appropriately configured or designed, can serve as a messaging or message analysis system. The computer system 700 includes any number of processors 702 (also referred to as central processing units, or CPUs) that are coupled to storage devices including primary storage 706 (typically a random access memory, or RAM), primary storage 704 (typically a read only memory, or ROM). CPU 702 may be of various types including microcontrollers and microprocessors such as programmable devices (e.g., CPLDs and FPGAs) and unprogrammable devices such as gate array ASICs or general-purpose microprocessors. As is well known in the art, primary storage 704 acts to transfer data and instructions uni-directionally to the CPU and primary storage 706 is used typically to transfer data and instructions in a bi-directional manner. Both of these primary storage devices may include any suitable computer-readable media such as those described herein. A mass storage device 708 is also coupled bi-directionally to CPU 702 and provides additional data storage capacity and may include any of the computer-readable media described herein. Mass storage device 708 may be used to store programs, data and the like and is typically a secondary storage medium such as a hard disk. It will be appreciated that the information retained within the mass storage device 708, may, in appropriate cases, be incorporated in standard fashion as part of primary storage 706 as virtual memory. A specific mass storage device such as a CD-ROM 714 may also pass data uni-directionally to the CPU.

CPU 702 is also coupled to an interface 710 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 702 optionally may be coupled to an external device such as a database or a computer or telecommunications network using an external connection as shown generally at 712. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store representational information regarding one or more of the following: account or subscription information, messages, message semantic features, classification information, feature vectors, class lexicons, topic models, statistics regarding messages and classification, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method of analyzing and using messages sent for a plurality of promoting entity accounts, comprising:
    obtaining a plurality of models for classifying a plurality of messages based on a plurality of message features for each message, each message sent via a computer network between a selected one of the promoting entity accounts and one or more subscribing users that subscribe to receive messages from such selected promoting entity account, wherein each model is trained to identify whether a message belongs to a particular class based on a lexicon that was generated for such particular class and a training set of messages that belong to the particular class and messages that do not belong to the particular class; and
    classifying a new message based on the models and retaining classification information regarding the new message in a database that is accessible by a user so as to review the classification information on a computer display.

2. The method of claim 1, further comprising providing content from the new message to other users who are not subscribers to the new message's corresponding promoting entity account based on the classification of such new message.

3. The method of claim 1, wherein obtaining the models and classification are performed using a Gradient Boosted Decision Trees algorithm, the method further comprising generating a particular lexicon for a particular class by:
    manually classifying a sample of messages as belonging to the particular class;
    forming the particular lexicon from a top percentage of most frequently used tokens from the sample of messages;
    automatically clustering a larger sample of messages into a plurality of topics; and
    to the particular lexicon, adding tokens from one or more topics that also include one or more tokens the particular lexicon.

4. The method of claim 3, further comprising ranking the messages from the larger sample based on the messages that are most likely to belong to the particular class and only clustering a percentage of the highest ranked messages for the particular class.

5. The method of claim 4, further comprising training a particular model for the particular class by:
    providing a training set of messages that belong to the particular class and messages that do not belong to the particular class;
    determining a plurality of feature values for each message in the training set; and
    continuing to adjust the particular model as a function of the features values of each message in the training set and the particular lexicon until the particular model classifies the training set with a predetermined level of accuracy.

6. The method of claim 5, wherein the feature values correspond to the percentage of message tokens that are in the particular lexicon and one or more of the following: percentage of numeric message tokens, percentage of message tokens from a junk lexicon, percentage of message tokens that are URL's (universal resource locators), message length, and percentage of message tokens that are pronouns.

7. The method of claim 3, wherein the clustering is performed by a Latent Dirichlet Allocation algorithm.

8. An apparatus comprising at least a processor and a memory, wherein the processor and/or memory are configured to perform the following operations:
    obtaining a plurality of models for classifying a plurality of messages based on a plurality of message features for each message, each message sent via a computer network between a selected one of the promoting entity accounts and one or more subscribing users that subscribe to receive messages from such selected promoting entity account, wherein each model is trained to identify whether a message belongs to a particular class based on a lexicon that was generated for such particular class and a training set of messages that belong to the particular class and messages that do not belong to the particular class; and classifying a new message based on the models and retaining classification information regarding the new message in a database that is accessible by a user so as to review the classification information on a computer display.

9. The apparatus of claim 8, wherein the processor and/or memory are further configured to provide content from the new message to other users who are not subscribers to the new message's corresponding promoting entity account based on the classification of such new message.

10. The apparatus of claim 8, wherein obtaining the models and classification are performed using a Gradient Boosted Decision Trees algorithm, wherein the processor and/or memory are further configured to generate a particular lexicon for a particular class by:

manually classifying a sample of messages as belonging to the particular class;

forming the particular lexicon from a top percentage of most frequently used tokens from the sample of messages;

automatically clustering a larger sample of messages into a plurality of topics; and to the particular lexicon, adding tokens from one or more topics that also include one or more tokens from the particular lexicon.

11. The apparatus of claim 10, wherein the processor and/or memory are further configured to rank the messages from the larger sample based on the messages that are most likely to belong to the particular class and only clustering a percentage of the highest ranked messages for the particular class.

12. The apparatus of claim 11, wherein the processor and/or memory are further configured to train a particular model for the particular class by:

providing a training set of messages that belong to the particular class and messages that do not belong to the particular class;

determining a plurality of feature values for each message in the training set; and continuing to adjust the particular model as a function of the features values of each message in the training set and the particular lexicon until the particular model classifies the training set with a predetermined level of accuracy.

13. The apparatus of claim 12, wherein the feature values correspond to the percentage of message tokens that are in the particular lexicon and one or more of the following: percentage of numeric message tokens, percentage of message tokens from a junk lexicon, percentage of message tokens that are URL's (universal resource locators), message length, and percentage of message tokens that are pronouns.

14. The apparatus of claim 10, wherein the clustering is performed by a Latent Dirichlet Allocation algorithm.

15. At least one non-transitory computer readable storage medium having computer program instructions stored thereon that are arranged to perform the following operations:

obtaining a plurality of models for classifying a plurality of messages based on a plurality of message features for each message, each message sent via a computer network between a selected one of the promoting entity accounts and one or more subscribing users that subscribe to receive messages from such selected promoting entity account, wherein each model is trained to identify whether a message belongs to a particular class based on a lexicon that was generated for such particular class and a training set of messages that belong to the particular class and messages that do not belong to the particular class; and classifying a new message based on the models and retaining classification information regarding the new message in a database that is accessible by a user so as to review the classification information on a computer display.

16. The at least one computer readable storage medium of claim 15, wherein the computer program instructions are further arranged to provide content from the new message to other users who are not subscribers to the new message's corresponding promoting entity account based on the classification of such new message.

17. The at least one computer readable storage medium of claim 15, wherein obtaining the models and classification are performed using a Gradient Boosted Decision Trees algorithm, wherein the computer program instructions are further arranged to generate a particular lexicon for a particular class by:

manually classifying a sample of messages as belonging to the particular class;

forming the particular lexicon from a top percentage of most frequently used tokens from the sample of messages;

automatically clustering a larger sample of messages into a plurality of topics; and to the particular lexicon, adding tokens from one or more topics that also include one or more tokens from the particular lexicon.

18. The at least one computer readable storage medium of claim 15, wherein the computer program instructions are further arranged to rank the messages from the larger sample based on the messages that are most likely to belong to the particular class and only clustering a percentage of the highest ranked messages for the particular class.

19. The at least one computer readable storage medium of claim 18, wherein the computer program instructions are further arranged to train a particular model for the particular class by providing a training set of messages that belong to the particular class and messages that do not belong to the particular class;

determining a plurality of feature values for each message in the training set; and continuing to adjust the particular model as a function of the features values of each message in the training set and the particular lexicon until the particular model classifies the training set with a predetermined level of accuracy.

20. The at least one computer readable storage medium of claim 19, wherein the feature values correspond to the percentage of message tokens that are in the particular lexicon and one or more of the following: percentage of numeric message tokens, percentage of message tokens from a junk lexicon, percentage of message tokens that are URL's (universal resource locators), message length, and percentage of message tokens that are pronouns.

* * * * *